(12) United States Patent
Richter et al.

(10) Patent No.: US 10,603,977 B2
(45) Date of Patent: Mar. 31, 2020

(54) AIR CONDITIONING SYSTEM AND METHOD FOR MULTI-ZONE AIR CONDITIONING OF A VEHICLE INTERIOR

(71) Applicant: Hanon Systems, Daejeon (KR)

(72) Inventors: Gerald Richter, Aachen (DE); Torsten Klein, Troisdorf (DE); Thomas Ehlers, Krefeld (DE)

(73) Assignee: Hanon Systems, Daejeon (KR)

( * ) Notice: Subject to any disclaimer, the term of this patent is extended or adjusted under 35 U.S.C. 154(b) by 0 days.

(21) Appl. No.: 15/661,735

(22) Filed: Jul. 27, 2017

(65) Prior Publication Data

US 2018/0029437 A1 Feb. 1, 2018

(30) Foreign Application Priority Data

Jul. 27, 2016 (DE) .......................... 10 2016 113 823
Jul. 18, 2017 (DE) .......................... 10 2017 116 191

(51) Int. Cl.
*B60H 1/00* (2006.01)

(52) U.S. Cl.
CPC ..... *B60H 1/00064* (2013.01); *B60H 1/00678* (2013.01); *B60H 1/00842* (2013.01); *B60H 1/0055* (2013.01); *B60H 1/00057* (2013.01); *B60H 1/00271* (2013.01); *B60H 1/00507* (2013.01); *B60H 1/00564* (2013.01);
(Continued)

(58) Field of Classification Search
CPC ............ B60H 1/00064; B60H 1/00564; B60H 1/00507; B60H 1/00842; B60H 2001/00135; B60H 1/00271; B60H 1/00057; B60H 1/00521; B60H 1/00557; B60H 1/0055

See application file for complete search history.

(56) References Cited

U.S. PATENT DOCUMENTS 6,427,770 B2 * 8/2002 Beck .................. B60H 1/00064
165/203
6,668,909 B2 * 12/2003 Vincent ................ B60H 1/0005
165/203

(Continued)

FOREIGN PATENT DOCUMENTS

DE       102010000990 A1    7/2011
JP       H08318725 A       12/1996
(Continued)

*Primary Examiner* — Frantz F Jules
*Assistant Examiner* — Lionel Nouketcha
(74) *Attorney, Agent, or Firm* — Norton Rose Fulbright US LLP (57) ABSTRACT

Air conditioning system for multi-zone air conditioning of a motor vehicle interior comprising a casing with a mixing chamber and several zone outlets outgoing from mixing chamber, in which an evaporator and at least one heat exchanger are disposed such that main air flow from evaporator through at least one heat exchanger into zone outlets is linear and at least two bypass channels, each comprising a louver, in order to circumvent at least one heat exchanger connect a region downstream of evaporator and a region downstream of at least one heat exchanger, wherein the first bypass channel, as a mixing bypass channel, opens out into mixing chamber and the second bypass channel, as a stratification bypass channel, opens out into a zone outlet.

12 Claims, 6 Drawing Sheets

(52) U.S. Cl.
CPC .............. *B60H 2001/00128* (2013.01); *B60H 2001/00135* (2013.01)

(56) References Cited

U.S. PATENT DOCUMENTS

| | | | | |
|---|---|---|---|---|
| 7,708,055 | B2* | 5/2010 | Koukouravas | B60H 1/00064 165/202 |
| 8,376,819 | B2* | 2/2013 | Vincent | B60H 1/00028 165/42 |
| 9,914,433 | B2* | 3/2018 | Capellmann | B60H 1/00042 |
| 9,956,843 | B2* | 5/2018 | Laux | B60H 1/0005 |
| 10,029,536 | B2* | 7/2018 | Kakizaki | B60H 1/00064 |
| 2011/0174000 | A1 | 7/2011 | Richter et al. | |
| 2012/0252342 | A1* | 10/2012 | Stang | B60H 1/0005 454/126 |
| 2016/0082807 | A1* | 3/2016 | Richter | B60H 1/0005 454/160 |
| 2016/0272037 | A1* | 9/2016 | Gesell | B60H 1/00064 |

FOREIGN PATENT DOCUMENTS

| | | | |
|---|---|---|---|
| JP | 2001030733 A | 2/2001 | |
| KR | 20140073034 A | 6/2014 | |

* cited by examiner

AIR CONDITIONING SYSTEM AND METHOD FOR MULTI-ZONE AIR CONDITIONING OF A VEHICLE INTERIOR

This application claims priority from German Patent Application Nos. 102016113823.1 filed Jul. 27, 2016 and 102017116191.0 filed Jul. 18, 2017, each of which is incorporated herein by reference in its entirety for all purposes.

The invention relates to an air conditioning system and a method for the multi-zone air conditioning of a motor vehicle interior. The invention is in particular suitable for application in an electric vehicle.

In conventional air conditioning systems (HVAC, Heating, Ventilation and Air Conditioning) comprising in their fundamental configuration an inlet, a fan, heat exchanger and/or evaporator as well as at least one outlet, an excess of heat is generated, wherein the desired temperature is set by mixing a hot air flow with cold air. In electric vehicles heat is generated by electric heaters (PTC heaters) or by heat pump systems. The temperature required for the air conditioning is only set to the maximum required temperature in order to increase system efficiency and vehicle coverage. However, multi-zone air conditioning systems are difficult to realize in electric vehicles. Dual-zone air conditioning systems can be realized using split PTC [Positive Temperature Coefficient] for example—however, heat pump systems do not offer dual-zone functionality. Additional temperature zones, for example, in a back region, cannot be generated since the maximum temperature is determined by the front zone temperature.

DE 10 2010 000 990 discloses a method for operating an air conditioning system for conditioning air for the passenger compartment of a motor vehicle within an air channel. The air conditioning system comprises a main flow passage, a bypass with a stratification louver as well as air conduction elements. The stratification louver serves for the stratification and conduction of a partial air mass flow to circumvent a heat exchanger. At the output of the air conditioning device the partial air mass flows are combined by means of air conduction elements to form a stratified total air mass flow and conducted into the passenger compartment. The known solution does not provide air conditioning multiple zones of the passenger compartment.

The invention therefore addresses the problem of proposing an air conditioning system for an electric vehicle with which multi-zone air conditioning of the vehicle interior can be realized. A further problem addressed by the invention is proposing a method for multi-zone air conditioning of a motor vehicle interior.

The problem is resolved through an air conditioning system with the characteristics according to patent claim 1 and a method with the characteristics according to claim 9. Further developments and advantageous implementations of the invention are specified in the particular dependent patent claims.

The air conditioning system according to the invention for the multi-zone air conditioning of a motor vehicle interior comprises a casing built with a mixing chamber and several zone outlets outgoing from the mixing chamber, in which casing an evaporator and at least one heat exchanger are disposed such that a main air flow from the evaporator through the at least one heat exchangers into the zone outlets is linear. Consequently, a linear flow for low NVH (Noise, Vibration, Harshness, indicating undesirable background noise) values is advantageously attained. According to the invention the air conditioning system comprises furthermore at least two bypass channels, each comprising a louver, which, to circumvent the at least one heat exchanger, connect a region downstream of the evaporator and a region downstream of the at least one heat exchanger, wherein a first bypass channel, as a mixing bypass channel, opens out into the mixing chamber and a second bypass channel, as a stratification bypass channel opens out into a zone outlet. Through the stratification of a zone outlet a temperature difference between two zone outlets can be obtained in a so-called mixed mode.

Based on the concept according to the invention each zone outlet of the air conditioning system comprises a louver to control the air flow through the zone outlets. The louvers incorporated in the bypass channels are provided in order to control the quantity of cold air through the bypass channels.

According to one implementation variant of the air conditioning system according to the invention, the at least one heat exchanger can comprise a heat pump-heat exchanger and/or an electric resistance heating element (PTC element). According to a further development of the air conditioning system according to the invention several heat exchangers can be provided, wherein a linear main air flow through all heat exchangers is realized.

According to a further advantageous implementation variant of the air conditioning system according to the invention a first zone outlet can be provided as a floor outlet, a second zone outlet as a dashboard outlet and a third zone outlet as a de-icing outlet. According to an advantageous implementation variant the stratification bypass channel can open out into the dashboard outlet. Consequently, to the dashboard outlet cold air is added such that a stratification or layering with respect to the floor outlet is achieved.

Moreover, an advantageous implementation variant of the air conditioning system according to the invention can be provided in which a stratification louver function is integrated in a louver of the dashboard outlet, wherein the louver of the dashboard outlet comprises means for adjusting the air flow through the stratification channel. The number of louvers can thereby advantageously be reduced. A combination of both functions in one channel with operating elements on one louver can furthermore be provided.

According to a further development of the air conditioning system according to the invention a further zone outlet for a back zone of a motor vehicle and a third, or further, bypass channel comprising a louver can be provided for air conditioning the back zone.

The air conditioning system according to the invention can be implemented as a dual-zone air conditioning system with a single zone heating element as the heat exchanger. Herein a temperature difference between a left side and a right side or between a front zone and a back zone can be adjusted.

The air conditioning system according to the invention can furthermore be implemented as a tri-zone or quad-zone air conditioning system.

The invention comprises furthermore a method for the multi-zone air conditioning of a motor vehicle interior of an electric vehicle with the air conditioning system according to the invention. In the method according to the invention a temperature of a main air flow is set at the at least one heat exchanger to the highest temperature required in an air conditioning zone of a vehicle interior, wherein, for generating an air temperature difference in a further air conditioning zone of the vehicle interior, cold air is added to a zone outlet from a bypass channel.

Setting the air temperature in individual air conditioning zones can be attained by adding air flows from different bypass channels.

According to an implementation variant of the method according to the invention a dashboard-floor temperature difference can be adjusted by supplying cold air from the stratification bypass channel into the dashboard outlet. The cold air supply can herein be controlled by a louver disposed in a bypass channel.

Further details, characteristics and advantages of implementations of the invention are evident based on the following description of embodiment examples with reference to the associated drawing. Therein depict:

FIG. 3b: a perspective representation of the air conditioning system shown in FIG. 3a, FIG. 4a/b: a schematic sectional view of the air conditioning system according to the invention in an operating mode for a left side (4a) and in a further operating mode for a right side (4b), FIG. 5a/b: a schematic sectional view of the air conditioning system according to the invention in a further operating mode for a left side (5a) and a yet further operating mode for a right side (5b), FIG. 6a/b: a schematic sectional view of an embodiment example of the air conditioning system according to the invention in a first operating mode (6a) and in a second operating mode (6b).

Recurring characteristics are identified in the Figures by identical reference numbers.

Figure 1A:
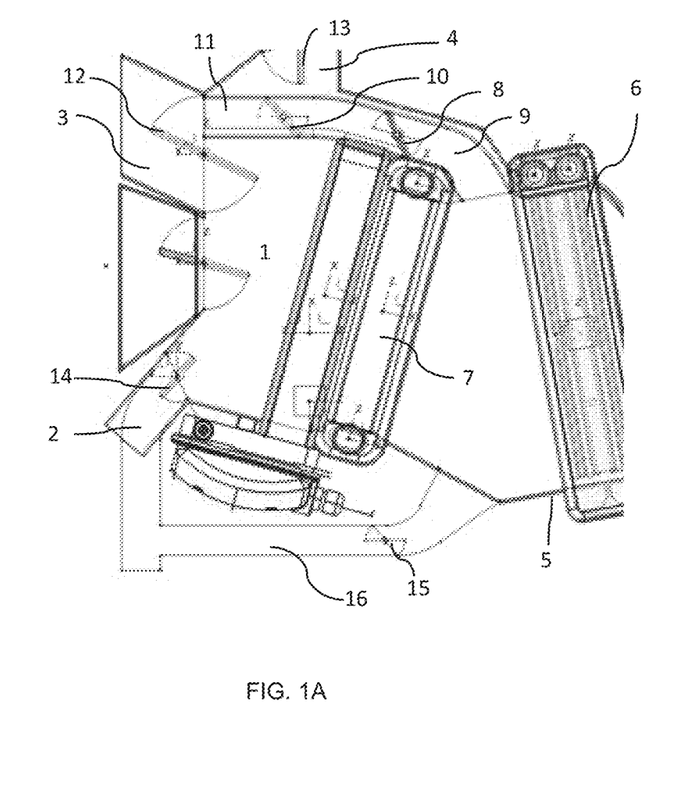
FIG. 1a: a schematic sectional view of an embodiment example of the air conditioning system according to the invention.

FIG. 1a shows a schematic sectional view of an embodiment example of the air conditioning system according to the invention with a mixing chamber 1 and a casing 5, comprised of several zone outlets 2, 3, 4 outgoing from the mixing chamber 1, in which an evaporator 6 and at least one heat exchanger 7 are disposed such that a main air flow from the evaporator 6 through the at least one heat exchanger 7 into the zone outlets 2, 3, 4 is linear. In the depicted embodiment example a first zone outlet 2 is provided as a floor outlet, a second zone outlet 3 as a dashboard outlet, and a third zone outlet 4 as a de-icing outlet. The floor outlet 2 comprises a louver 14, the dashboard outlet 3 a louver 12 and the de-icing outlet 4 a louver 13. The reference numbers 9 and 10 identify bypass channels which, for the circumvention of the at least one heat exchanger 7, connect a region downstream of the evaporator 6 and a region downstream of the at least one heat exchanger 7, wherein a first bypass channel 9 as a mixing bypass channel opens out into the mixing chamber 1 and a second bypass channel 11 as a stratification bypass channel opens out into the dashboard outlet 3.

Figure 1B:
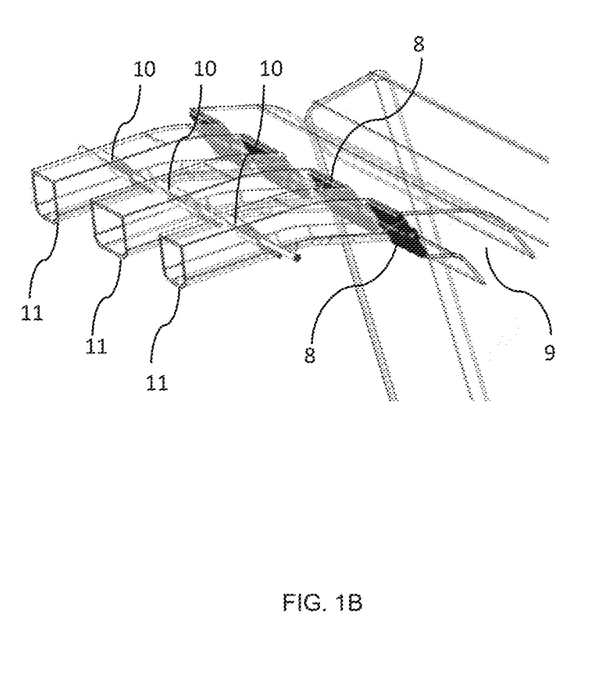
FIG. 1b: a perspective partial representation of the embodiment example shown in FIG. 1a of the air conditioning system according to the invention.

FIG. 1b shows a perspective partial representation of the embodiment example of the air conditioning system according to the invention depicted in FIG. 1a. According to this embodiment variant the stratification bypass channel 11 is provided with a threefold extension, wherein each extension comprises a louver 10. The two outer extensions can be assigned to a right side or to a left side or to a left air conditioning zone or to a right air conditioning zone. The louvers 10 in the particular extensions can usefully be implemented such that they are controllable independently of one another. The central extension of the stratification bypass channel 11 can be provided for a central air conditioning zone. The mixing bypass channel 9 comprises four louvers 8, across which the mixing bypass channel 9 opens out into the mixing chamber 1.

Figure 6A:
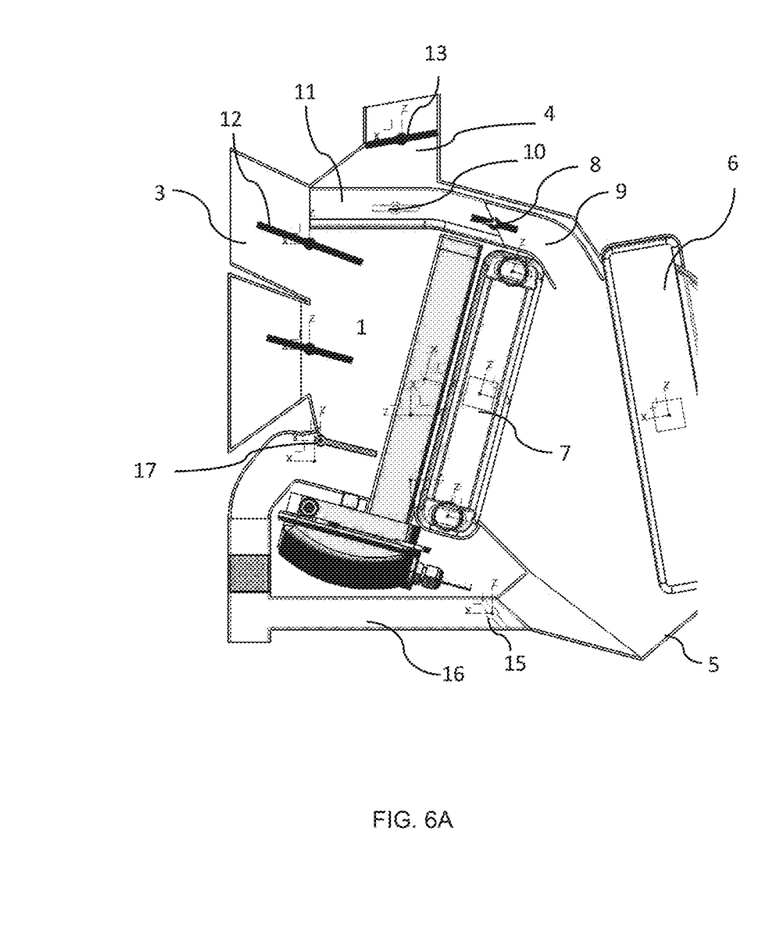
Figure 6B:
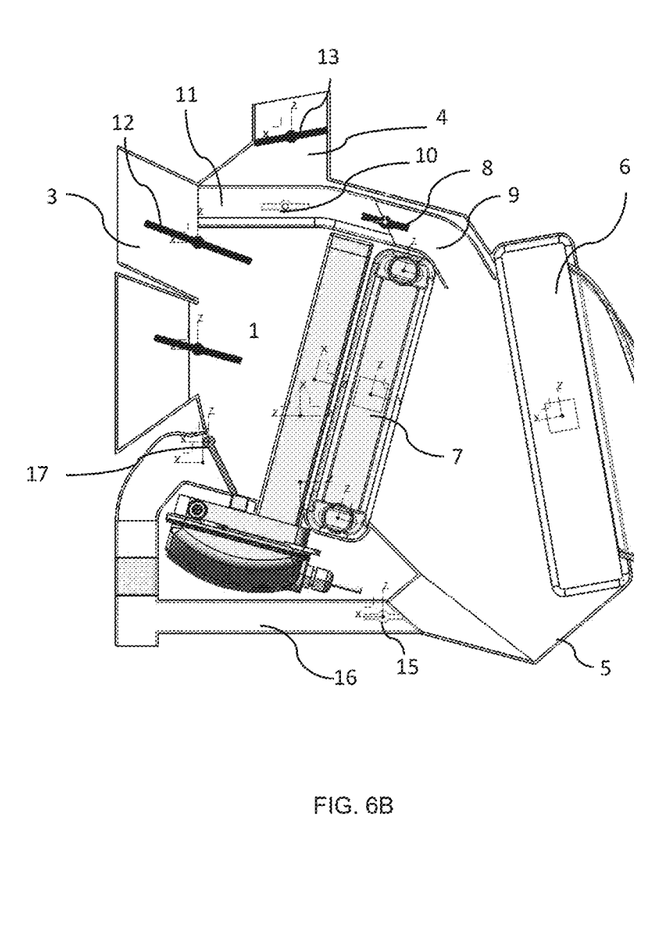

The reference number 16 indicates a further bypass channel with a louver 15 for air conditioning a back zone. This further development of the air conditioning system according to the invention is explained in greater detail in FIG. 6.

Figure 2A:
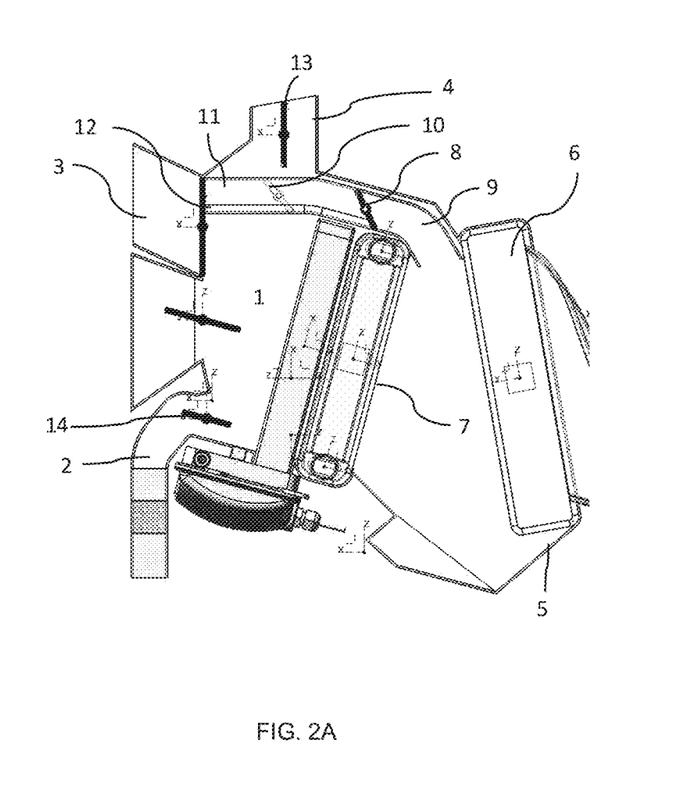
FIG. 2a: a schematic sectional view of the air conditioning system according to the invention in one operating mode.
Figure 2B:
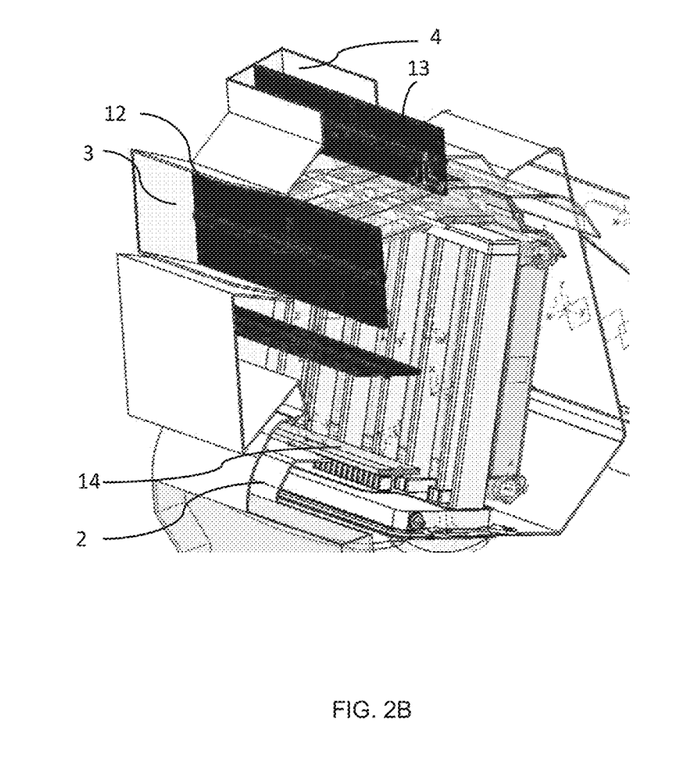
FIG. 2b: a perspective representation of the air conditioning system shown in FIG. 2a, FIG. 3a: a schematic sectional view of the air conditioning system according to the invention in a further operating mode.

FIG. 2a shows a schematic sectional view of the air conditioning system according to the invention in one operating mode, wherein louvers 8, 10 and 12 are in a closed position and louvers 13 and 14 in an open position such that air can reach through the floor outlet 2 and the de-icing outlet 4. Due to the closed louvers 8 and 10, no cold air flows across the bypass channels 9 and 11. Adjoining the floor outlet 2 is a connection for a rear channel (not shown) to a back zone. FIG. 2b shows a perspective representation for better understanding the operating mode of the air conditioning system depicted in FIG. 2a.

Figure 3A:
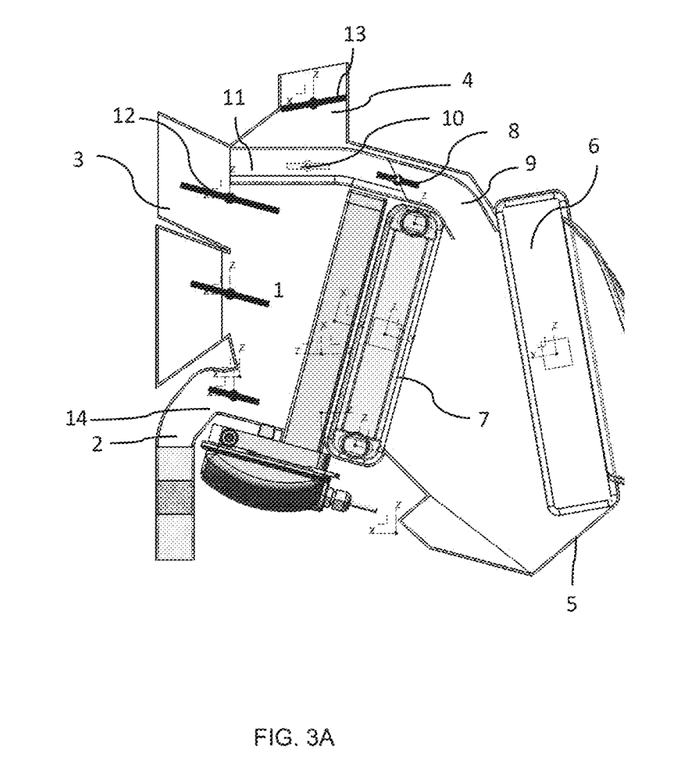
Figure 3B:
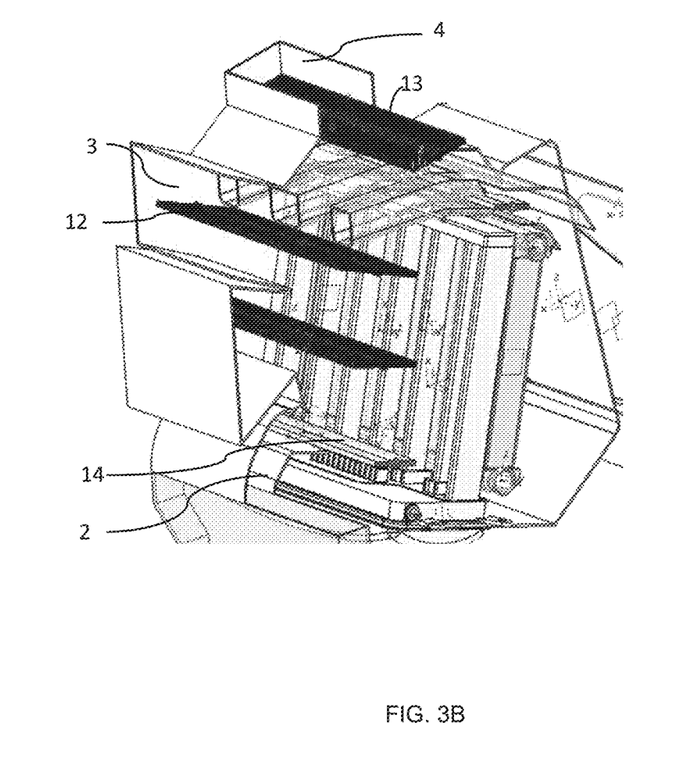

FIG. 3a shows a schematic sectional representation of the air conditioning system according to the invention in a further operating mode, wherein the louver 12 of the dashboard outlet 3 and the louver 14 of the floor outlet 2 are open. Simultaneously, louvers 8 of the mixing bypass channel 9 and louvers 10 of the stratification bypass channel 11 are open such that air can flow across the mixing bypass channel 9 and arrive in the mixing chamber 1 and across the stratification bypass channel 11 in the dashboard outlet 3. FIG. 3b shows a perspective representation for better understanding the operating mode shown in FIG. 3a of the air conditioning system according to the invention.

Figure 4A:
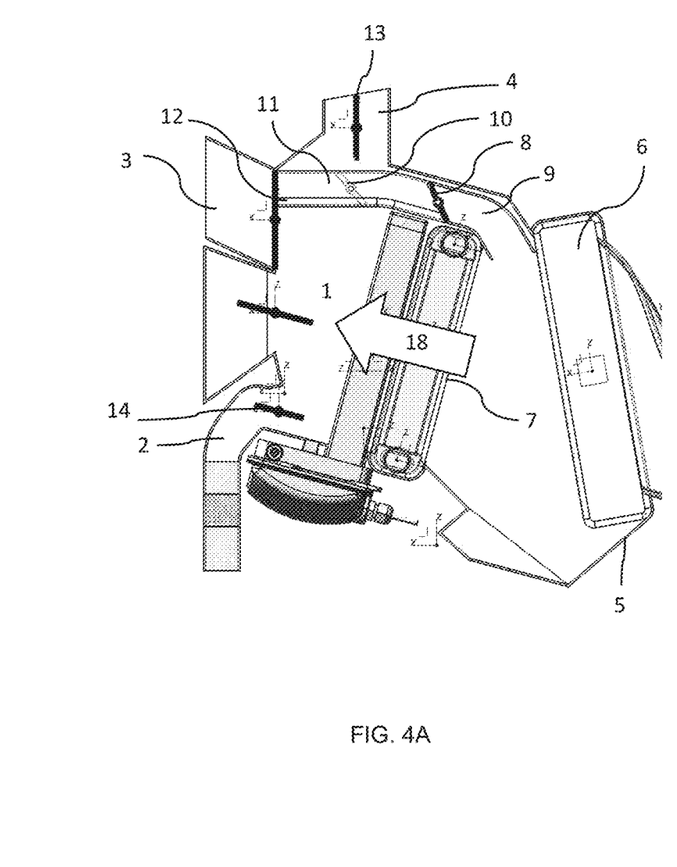

FIG. 4a shows a schematic sectional representation of the air conditioning system according to the invention in an operating mode for a left side, wherein the louver 8 on a left side of the air conditioning system is in a closed position such that no air can reach the mixing chamber 1 across the mixing bypass channel 9. The louver 13 of the de-icing outlet 4 and the louver 14 of the floor outlet 2 are herein in an open position such that heated air of the main air channel, identified by arrow 18, can flow through the de-icing outlet 4 and the floor outlet 2. The louver 12 of the dashboard outlet 3 is herein closed such that no air can flow through the dashboard outlet 3.

Figure 4B:
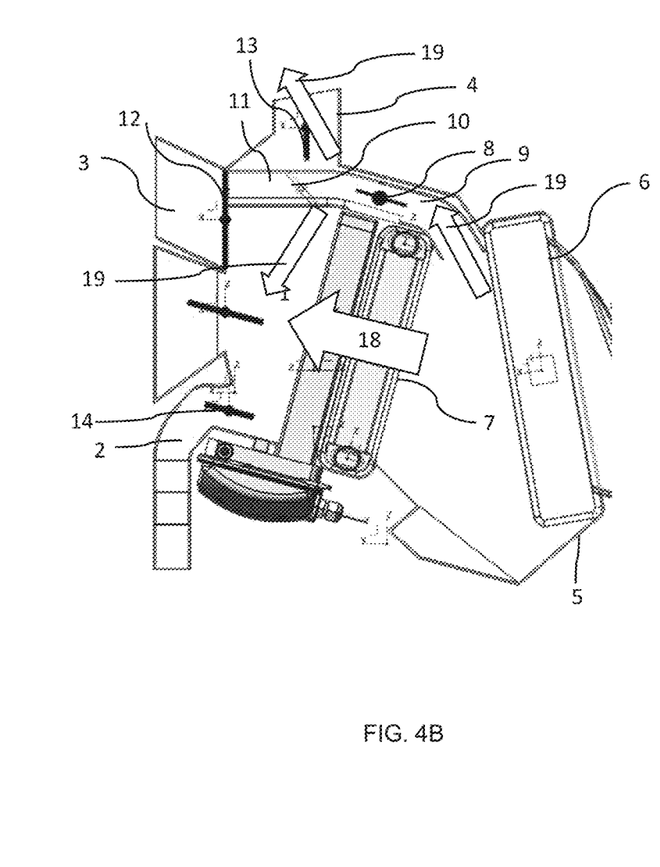

FIG. 4b shows a schematic sectional representation of the air conditioning system according to the invention in an operating mode for a right side, wherein, in contrast to the operating mode of the left side (FIG. 4a), on a right side of the air conditioning system a louver 8 of the mixing bypass channel 9 is in an open position such that cold air, indicated by arrows 19, can flow through the de-icing outlet 4 and reach the mixing chamber 1 where cold air is mixed with the heated main air flow 18. By mixing the heated main air flow 18 with cold air 19 from the mixing bypass channel 9, at the floor outlet 2 of the right side an air flow is attained with, compared to the floor outlet 2 of the left side, a lower temperature.

Figure 5A:
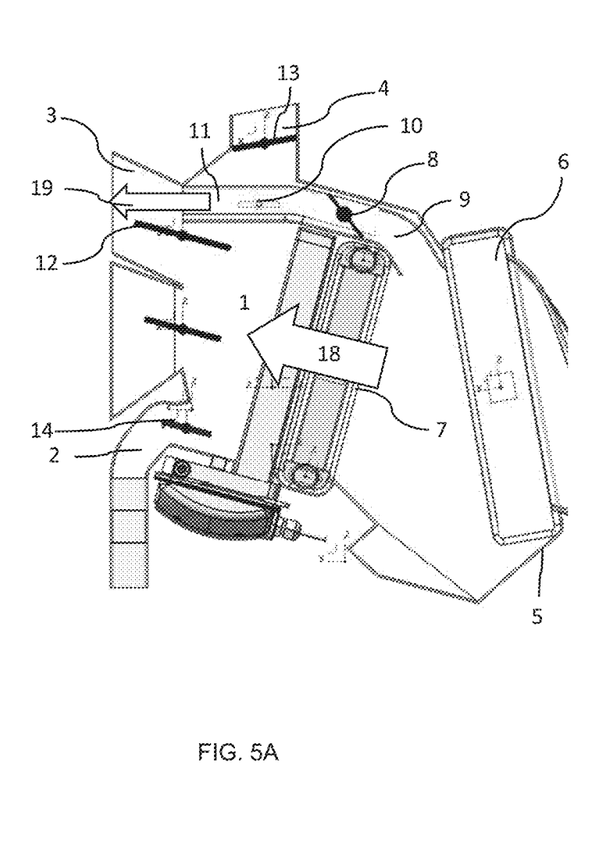

FIG. 5a shows a schematic sectional representation of the air conditioning system according to the invention in a further operating mode for a left side, wherein the louver 10 on a left side of the air conditioning system, which means louver 10 of a left extension of the stratification bypass channel 11, is in an open position such that cold air can reach across the stratification bypass channel 11 to a left open dashboard outlet 3 as is indicated by the cold air arrow 19. Simultaneously, louver 14 of the floor outlet 2 is in an open position such that heated air of the main air channel, identified by arrow 18, can flow through the floor outlet 2. Thereby that the cold air 19 reaches directly into the dashboard outlet 3, on the left side of the air conditioning system a temperature difference is attained between the floor outlet 2 and the dashboard outlet 3.

Figure 5B:
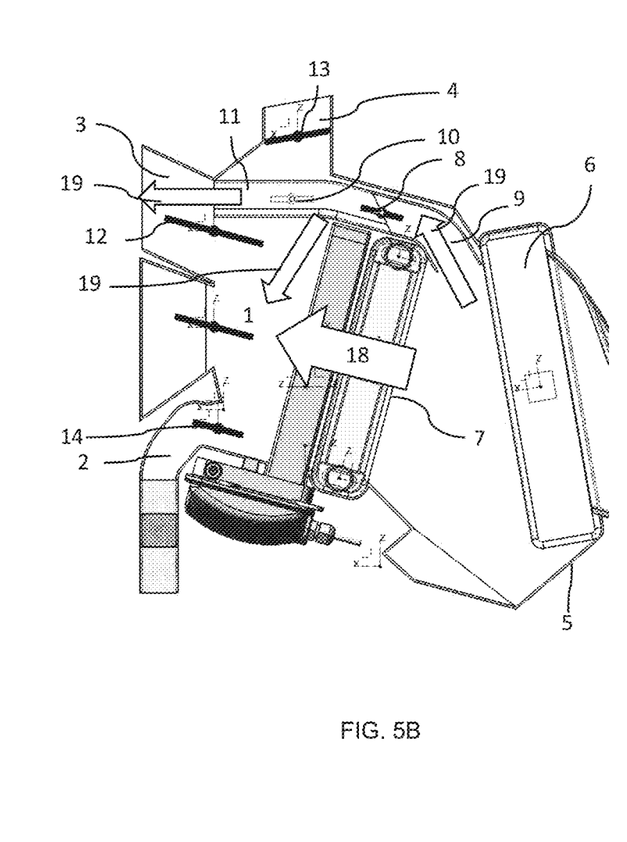

FIG. 5b show a schematic sectional representation of the air conditioning system according to the invention in yet another operating mode for a right side, wherein, in contrast to the operating mode of the left side (FIG. 5a), on a right side of the air conditioning system a louver 8 of the mixing bypass channel 9 is in an open position such that cold air, identified by the arrows 19, can reach into a right dashboard outlet 3 and into the mixing chamber 1 where cold air 19 is mixed with the heated main air flow 18. By mixing the heated main air flow 18 with the cold air 19 from the mixing bypass channel 9, at the floor outlet 2 of the right side an air flow is attained with a lower temperature compared to the floor outlet 2 of the left side (FIG. 5a).

FIG. 6a shows a schematic sectional representation of an embodiment example of the air conditioning system according to the invention in a first operating mode. In contrast to the preceding embodiment examples, in this embodiment variant a further bypass channel 16 with a louver 15 for the air conditioning of a back zone is additionally provided. FIG. 6 thus shows an implementation of a tri-zone air conditioning system. The further bypass channel 16 comprises a connection between a region downstream of the evaporator 6 and a region downstream of the heat exchanger 7. In the mixing chamber 1, furthermore, a louver 17 for the back zone is provided. In FIG. 6a this back zone louver 17 is in an open position, wherein the louver 15 of the further bypass channel 16 is in a closed position such that warm air of the main air flow can reach the back zone.

FIG. 6b shows a schematic sectional representation of the embodiment example, shown in FIG. 6a, of the air conditioning system according to the invention in a second operating mode, wherein louver 15 of the further bypass channel 16 is in an open position and the back zone louver 17 in a closed position such that exclusively cold air reaches the back zone. In this embodiment variant the upper bypass channels 9 and 10 are provided for the temperature regulation of a front zone right and left and the lower further bypass channel 16 for the temperature regulation of a back zone. If the back zone is the warmest zone, the heat exchanger or heat exchangers is/are set to the required discharge temperature through the heat pump system or through a voltage in the PTC heating element. The front zone, adjusted to a cooler temperature, can in this case be lowered through the addition of cold air by opening the louver of the mixing bypass channel. The stratification bypass channel 11, furthermore, serves only for cooling the dashboard outlets 3, wherein a layering in a so-called mixed mode between the dashboard outlet or outlets 3 and the floor outlet or outlets 2 is attained.

LIST OF REFERENCE NUMBERS

1 Mixing chamber
2 Floor outlet
3 Dashboard outlet
4 De-icing outlet
5 Casing
6 Evaporator
7 Heat exchanger
8 Louver/Mixing bypass channel louver
9 Mixing bypass channel
10 Louver/Stratification bypass channel louver
11 Stratification bypass channel
12 Louver/Dashboard outlet louver
13 Louver/De-icing outlet louver
14 Louver/Floor outlet louver
15 Louver for further bypass channel
16 Further bypass channel
17 Back zone louver
18 Main air flow/Warm air
19 Cold air flow/Cold air

The invention claimed is:

1. An air conditioning system for multi-zone air conditioning of a motor vehicle interior comprising:
a casing built with a mixing chamber and with several zone outlets outgoing from the mixing chamber, wherein an evaporator and at least one heat exchanger are disposed in the casing such that a main air flow from the evaporator through the at least one heat exchanger into the zone outlets is linear, and
at least two bypass channels which, for the purpose of circumventing the at least one heat exchanger, connect a region downstream of the evaporator and a region downstream of the at least one heat exchanger, wherein each of the at least two bypass channels comprise one louver;
wherein a first bypass channel is a mixing bypass channel and opens out into the mixing chamber and wherein a second bypass channel is a stratification bypass channel and opens out into a zone outlet, and
wherein all of the air to the second bypass channel comes from the first bypass channel;
wherein a first zone outlet is provided as a floor outlet, a second zone outlet is provided as a dashboard outlet and a third zone outlet as a de-icing outlet; wherein the stratification bypass channel opens out into the dashboard outlet; and
wherein a further zone outlet for a back zone and a third bypass channel comprising a louver are provided for the air conditioning of the back zone.

2. An air conditioning system according to claim 1, wherein the at least one heat exchanger comprises at least one member selected from the group consisting of a heat pump-heat exchanger and an electric resistance heating element.

3. An air conditioning systems according to claim 2, having a louver of the dashboard outlet, wherein the louver of the dashboard outlet adjusts the air flow through a stratification channel of the louver.

4. An air conditioning system according to claim 2, wherein a temperature difference between a left side of the air conditioning system and a right side of the air conditioning system is adjustable.

5. An air conditioning systems according to claim 1, having a louver of the dashboard outlet, wherein the louver of the dashboard outlet adjusts air flow through a stratification channel of the louver.

6. An air conditioning system according to claim 1, wherein a temperature difference between a left side of the air conditioning system and a right side of the air conditioning system is adjustable.

7. An air conditioning system according to claim 1 wherein a temperature difference between a front zone and a back zone is adjustable.

8. A method for multi-zone air conditioning of a motor vehicle interior with an air conditioning system according to claim 1, wherein for generating an air temperature difference in a further air conditioning zone of the motor vehicle interior, cold air is added from a bypass channel.

9. A method according to claim 8, wherein a dashboard-floor temperature difference is adjusted by adding cold air from the stratification bypass channel into the dashboard outlet.

10. A method according to claim 8, wherein a cold air supply is controlled through a louver disposed in a bypass channel.

11. An air conditioning systems according to claim 10, having a louver of the dashboard outlet, wherein the louver of the dashboard outlet adjusts air flow through a stratification channel of the louver.

12. An air conditioning systems according to claim 1, having a louver of the dashboard outlet, wherein the louver of the dashboard outlet adjusts air flow through a stratification channel of the louver.

* * * * *